United States Patent
Drochon et al.

(10) Patent No.: US 7,674,331 B2
(45) Date of Patent: Mar. 9, 2010

(54) DUAL FUNCTION CEMENT ADDITIVE

(75) Inventors: Bruno Drochon, Noisy le Grand (FR); Sylwia Komocki, Chatenay Malabry (FR); Michel Michaux, Verrieres-le-Buisson (FR)

(73) Assignee: Schlumberger Technology Corporation, Surgar Land, TX (US)

( * ) Notice: Subject to any disclaimer, the term of this patent is extended or adjusted under 35 U.S.C. 154(b) by 996 days.

(21) Appl. No.: 10/570,377

(22) PCT Filed: Aug. 25, 2004

(86) PCT No.: PCT/EP2004/009489

§ 371 (c)(1), (2), (4) Date: Mar. 1, 2006

(87) PCT Pub. No.: WO2005/024175

PCT Pub. Date: Mar. 17, 2005

(65) Prior Publication Data

US 2006/0254466 A1  Nov. 16, 2006

(30) Foreign Application Priority Data

Sep. 8, 2003  (GB) .................................. 0320938.4

(51) Int. Cl.
*C04B 14/04* (2006.01)
*C04B 103/20* (2006.01)

(52) U.S. Cl. ................. 106/600; 106/724; 106/726; 106/727; 106/728; 106/737; 106/819; 106/823

(58) Field of Classification Search ............... 106/737, 106/600, 724, 726, 727, 728, 729, 823, 819
See application file for complete search history.

(56) References Cited

U.S. PATENT DOCUMENTS

| | | | |
|---|---|---|---|
| 4,354,874 A * | 10/1982 | Vickers | |
| 5,049,288 A | 9/1991 | Brothers et al. | |
| 5,361,842 A * | 11/1994 | Hale et al. | |
| 5,447,197 A | 9/1995 | Rae et al. | |
| 5,547,506 A | 8/1996 | Rae et al. | |
| 6,562,122 B2 * | 5/2003 | Dao et al. ................... 106/705 | |
| 2003/0150615 A1 * | 8/2003 | Dao et al. | |

FOREIGN PATENT DOCUMENTS

FR  2 667 058  3/1992

OTHER PUBLICATIONS

SU 715539 A1 (Feb. 15, 1980) Krivorotov et al. Abstract only.*

* cited by examiner

*Primary Examiner*—Paul Marcantoni
(74) *Attorney, Agent, or Firm*—David Cate; Robin Nava; Jeff Griffin

(57) ABSTRACT

The use of silicate as a retarder enhancer at appropriate levels to enhance the retarding effect of retarders at high temperatures encountered downhole while accelerating the set of cement at lower temperatures encountered near to the surface.

6 Claims, 2 Drawing Sheets

DUAL FUNCTION CEMENT ADDITIVE

The present invention relates to the use of additives in cement slurries, and in particular to the use of such additives in well cementing slurries and operations.

Cement slurries for use in oil well cementing operations are typically based around Portland cement as a hydraulic binder. The setting of such cement, known as hydration, is a chemical reaction between the water present in the slurry and the cement material, the reaction causing the slurry to first gel and then set solid as it progresses over time. In use, a pumpable slurry of cement, water and other solid and or liquid additives is prepared at the surface.

It is particularly difficult to delay the hydration of Portland cements at elevated temperatures, and powerful retarders have been developed. However they can produce unpredictable results because the thickening time of cement slurry, and the time at which the compressive strength of cement begins to develop, are very sensitive to retarder concentration. Moreover, the upper temperature limit of these retarders sometimes is too low for cementing high-temperature wells. So, the addition of a retarder enhancer often is required. Sodium borate salts (e.g., borax) and boric acid are known to be effective "retarder enhancers." However these chemicals are not always compatible with some other high-temperature additives and, therefore, may impair the fluid-loss control and rheology of cement slurries.

It is known that sodium silicates accelerate the hydration of Portland cements at low temperature. Also, they are effective chemical activators for hydraulic binders based on blast furnace slags. In oilfield operations they are mainly used in drilling fluids, and also as "extender" for cement slurries. An extender enables to increase the amount of water that can be added to cement in order to decrease the slurry density without having settling problems. Cement slurries extended with sodium silicates are particularly difficult to retard, and the use of powerful retarders is generally required.

The use of retarders can bring certain operational difficulties as are mentioned above. For example, there can be compatibility problems between the retarders and other components of cement slurries, the retarder can cause excessive delay in set at surface, behaviour of retarders can be unpredictable at high concentrations, and the behaviour of retarders can be unpredictable at high temperatures.

FR 2,667,058 describes the use of silicates in retarded cement slurries in tie-back applications (i.e. when it is desired that the cement sheath extends all the way from the bottom of the well to the surface). In this application, a glucoheptonate retarder is used to retard set of the cement under the bottomhole conditions of higher temperatures and relatively large quantities (17.75 l/tonne of cement) of sodium silicate are included in the slurry to bring about set at the surface, which is at a much lower temperature.

Another problem that is regularly encountered in well cementing is that of variability of cement reactivity. The reactivity of a cement will establish how quickly a cement will set. In order to assist in cement job design, a series of cement classifications have been established which indicate the general level of reactivity of cement and suitability for certain applications of well cementing. One such classification is that of the American Petroleum Institute (API) which provides classifications A—H for cements suitable for well cementing. However, cements meeting such classifications are often relatively expensive. Construction cements are often cheaper and more readily available in many parts of the world than API cements. However, their variable reactivity and unreliable behaviour makes their use in well cementing applications risky, since there is often the chance that the slurry will set too quickly or not at all. When taken with the effects of temperature at the bottom and top of a well, and the unreliable nature of the effects of additives such as retarders, the use of these cements, while economically desirable, is considered unacceptably risky. At present, there is no easily implements way to control the setting properties of such cements so as to be able to render them useful for well cementing uses.

It is an object of the present invention to provide methods and compositions for retarding cement set which address some or all of the problems indicated above.

The present invention resides in the use of silicate as a retarder enhancer at appropriate levels to enhance the retarding effect of retarders at high temperatures encountered downhole while accelerating the set of cement at lower temperatures encountered near to the surface.

One aspect of the invention resides in the addition of one or more silicates or silica to a well cementing slurry containing a set retarder, characterised in that the amount of silicate or silica added to the slurry is sufficient to enhance the retarding effect of the set retarder under downhole conditions when compared to the retarding effect of the retarder alone, and is also sufficient to accelerate the set of the cement under conditions close to the surface when compared to the set of the cement containing the retarder.

Another aspect of the invention provides an improved retarder for use in well cementing slurries comprising a mixture of a set retarder and one or more silicates or silica, characterised in that the relative amounts of set retarder and silicates or silica are such that the retarding effect of the set retarder under downhole conditions is enhanced when compared to the retarding effect of the retarder alone, and the set of the cement under conditions close to the surface is accelerated when compared to the set of the cement containing the retarder.

The silica or silicates act as a retarder enhancer at the high downhole temperatures meaning that less retarder is needed, so avoiding the difficulties associated with the use of high retarder concentrations discussed above. At the lower uphole or surface temperatures, the silica or silicates act as a set accelerator, offsetting the effect of the presence of the retarder and allowing set at surface in a reasonable time. The ability to control both aspect of set mean that the exact nature of the cement used is less critical since it is possible to control this with retarders without encountering the problems identified above.

The present invention is particularly applicable to wells in which the bottom hole temperature is over 90° C., more particularly more than 100° C. and possibly over 120° C. up to about 180° C. The surface temperature (the top of the cement column or the upper portion of the well) can be less than 90° C., typically less than 80° C. and down to less than 40° C.

Where silica is used as the retarder enhancer, colloidal silica having a particle size of less than 100 nm is preferred.

Particularly preferred silicates for use in the invention are alkali metal silicates of the general formula $(SiO_2)_x(M_2O)$, where M is Na, K, etc. Preferably the $SiO_2:M_2O$ weight ratio is greater than 1, and more preferably falls in the range 1.63-3.27. For example, sodium silicates with $SiO_2:Na_2O$ weight ratios in the range 1.5-4 (molar ratios 1.55-4.12), and potassium silicates $SiO_2:K_2O$ weight ratios in the range 1-2.65 (molar ratios 1.56-4.14) are particularly preferred.

Where the silica or silicates are in liquid form, it is preferred that they are used in quantities of 1.5-20 l/tonne of cement.

The retarders that can be used with the present invention include retarders such as sodium gluconate, calcium glucoheptonate and mixtures of hydroxycarboxylic acids and lignosulphonates, unrefined and refined lignosulphonates, and mixtures of hydrocarboxylic acids and lignin amine derivatives These retarders can be in solid or liquid form, as appropriate.

In use, the retarder and the silicate retarder-enhancer can be pre-mixed before addition to the cement slurry. Alternatively, the retarder and the silicate enhancer can be added to the cement slurry separately. Other additives can be included in the cement slurry in the conventional manner.

One particularly preferred embodiment of the present invention provides an improved retarder comprising a mixture of sodium gluconate and sodium silicate ($SiO_2:Na_2O$ weight ratio of 3.27). Such a retarder is far less sensitive to temperature than prior art retarders. One particular embodiment of this retarder comprises 7.6 wt % sodium gluconate, 28.7 wt % sodium silicate and 63.7 wt % water. These proportions should be adjusted according to the type of retarder and of silicate used for the desired effect.

The present invention can be used with conventional oilfield cements based on Portland cement. It also has application to cements that have traditionally been held as unsuitable for well cementing uses, such as construction cements (e.g. Ordinary Portland Cement (OPC) ASTM Type II, or the like), due to their unpredictable or unreliable properties under well conditions. The invention is applicable to most OPC's (ASTM Type I to V) as well as Portland cements blended with pozzolanic materials such as fly ash, blast furnace slag or calcinated clay (e.g. metakaolin).

The present invention is described below in certain examples, with reference to the accompanying drawings, wherein.

EXAMPLES

Figure 1:
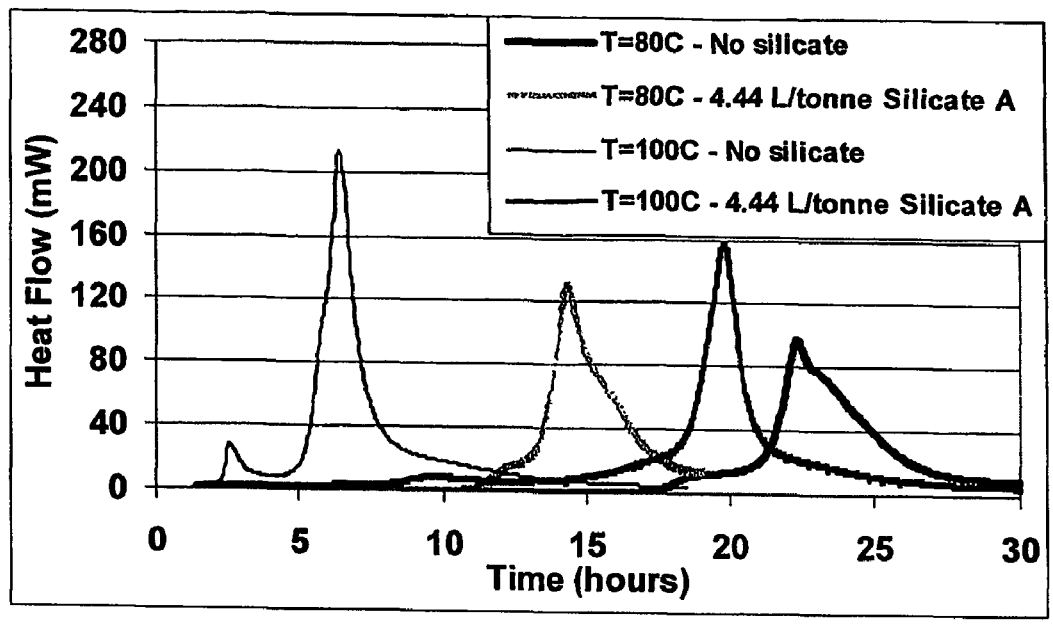
FIG. 1 shows calorimetric curves at 80° C. and 100° C. for slurries including retarder D with and without silicate A.

The features of alkali silicates, nanosilica suspension, and cement retarders used in these examples are gathered in Tables 1 and 2 below. The concentration of additives is given in percentage by weight of cement (% BWOC) for solids, and by litre per tonne of cement (L/tonne) for liquids. Cement slurries are mixed according to the API procedure; for 35 seconds in a Waring blender rotating at 12,000 RPM. Cement slurries are prepared with tap water at a density of 1.89 kg/L. They are placed in a high temperature-high pressure consistometer and tested at the indicated temperatures and pressures according to procedures outlined in API RP10B Recommended Practices for thickening time evaluation.

TABLE 1

Features of Alkali Silicates and Nanosilica

| Silicate | % $SiO_2$ (w/w) | % $Na_2O$ (w/w) | % $K_2O$ (w/w) | $SiO_2:Na_2O$ weight ratio molar ratio | $SiO_2:K_2O$ weight ratio molar ratio | Density |
|---|---|---|---|---|---|---|
| A | 29.50 | 9.02 | — | 3.27 3.37 | — | 1.39 |
| B | 32.04 | 11.18 | — | 2.87 2.96 | — | 1.48 |
| C | 26.95 | 13.53 | — | 1.99 2.05 | — | 1.47 |
| D | 28.30 | 17.39 | — | 1.63 1.68 | — | 1.57 |
| E* | 14.75 | 15.25 | — | 0.97 1.00 | — | — |
| F** | 19.67 | 20.33 | — | 0.97 1.00 | — | — |
| G | 26.32 | — | 12.30 | — | 2.14 3.34 | 1.38 |
| Nanosilica | 29.80 | — | — | — | — | 1.21 |

*solution of sodium metasilicate ($Na_2SiO_3$) at 30 wt %
**solution of sodium metasilicate at 40 wt %

TABLE 2

Features of Retarders

| Retarder | Form | Chemical Composition |
|---|---|---|
| A | Solid | Sodium gluconate |
| B | Solid | Calcium glucoheptonate |
| C | Solid | Mixture of hydroxycarboxylic acids and lignosulphonate |
| D | Liquid | Hydroxycarboxylic acid |
| E | Liquid | Mixture of hydroxycarboxylic acid and lignin amine derivative |
| F | Liquid | Unrefined lignosulphonate |
| G | Liquid | Refined lignosulphonate |
| H | Liquid | Organophosphonate |
| I | Liquid | Mixture of organophosphonate and phosphate salt |
| J | Liquid | Mixture of organophosphonate and borate salt |
| K | Liquid | Mixture of sodium gluconate and sodium silicate |

The effect of Sodium Silicate A on the thickening time of various cement slurries (the basic cement slurry comprises: API Class G cement, Black label type from Dyckerhoff Zementwerke, 35% BWOC Silica flour, 2.66 L/tonne Antifoam agent, 0.2% BWOC Antisettling agent. Slurry density: 1.89 kg/L, designed for high-temperature applications (120° C. and 150° C.), and is used as the basis for all examples below, unless indicated otherwise) is shown in Table 3 below:

TABLE 3

Effect of Silicate A on the Thickening Time with Different Retarders

| Retarder A (% BWOC) | 0.14 | 0.14 | — | — | — | — | 0.5 | 0.5 |
|---|---|---|---|---|---|---|---|---|
| Retarder B (% BWOC) | — | — | 0.14 | 0.14 | — | — | — | — |
| Retarder C (% BWOC) | — | — | — | — | 1 | 1 | — | — |
| Silicate A (L/tonne) | — | 9.94 | — | 9.94 | — | 17.75 | — | 17.75 |
| Temperature (° C.) | 120 | 120 | 120 | 120 | 150 | 150 | 150 | 150 |
| Pressure (psi) | 16,100 | 16,100 | 16,100 | 16,100 | 16,000 | 16,000 | 16,000 | 16,000 |
| Thickening Time (hr:min) | 1:56 | 7:03 | 8:53 | 12:25 | 1:58 | 4:20 | 0:34 | 5:41 |

It is noted that the addition of silicate A lengthens significantly the thickening time. The retarding effect is dramatic when cement slurries are retarded with retarder A.

Data of Table 4 below show that the thickening time is extended when increasing the concentration of Silicate A for the same basic slurry composition as above.

TABLE 4

Effect of the Concentration of Silicate A on the Thickening Time

| Retarder A (% BWOC) | 0.5 | 0.5 | 0.5 | 0.5 |
|---|---|---|---|---|
| Retarder C (% BWOC) | 0.5 | 0.5 | 0.5 | 0.5 |
| Silicate A (L/tonne) | — | 8.88 | 17.75 | 26.63 |
| Temperature (° C.) | 166 | 166 | 166 | 166 |
| Pressure (psi) | 19,000 | 19,000 | 19,000 | 19,000 |
| Thickening Time (hr:min) | 1:50 | 4:34 | 6:30 | 7:11 |

The temperature at which the Silicate A acts as a retarder enhancer is determined from the data gathered in Table 5:

TABLE 5

Effect of Silicate A on the Thickening Time at Different Temperatures

| Retarder A (% BWOC) | 0.05 | 0.05 | 0.05 | 0.05 | 0.05 | 0.05 | 0.05 | 0.1 | 0.1 | 0.25 | 0.25 |
|---|---|---|---|---|---|---|---|---|---|---|---|
| Silicate A (L/tonne) | 1.78 | 3.55 | 5.33 | 1.78 | 3.55 | 1.78 | 3.55 | 3.55 | 7.10 | 8.88 | 17.75 |
| Temperature (° C.) | 40 | 40 | 40 | 80 | 80 | 90 | 90 | 100 | 100 | 130 | 130 |
| Pressure (psi) | 2600 | 2600 | 2600 | 10200 | 10200 | 10200 | 10200 | 10200 | 10200 | 16100 | 16100 |
| Thickening Time (hr:min) | 9:46 | 8:37 | 6:24 | 2:33 | 2:26 | 3:13 | 2:52 | 7:21 | 11:39 | 3:15 | 5:55 |

Retarder A is used for these experiments. The expected accelerating effect of Silicate A is clearly seen at 40° C.; the thickening time decreases with increasing silicate concentration—silicate A is acting as an accelerator at this temperature. At 100° C. and 130° C. the thickening time is considerably lengthened with increasing silicate concentration. From these results it is clear that Sodium Silicate A behaves as a retarder-enhancer at temperatures above about 90° C.

Sodium Silicate A is tested with different retarders that can be used in well cementing operations. The hydration of Portland cements is an exothermic process and, therefore, its hydration kinetics can be followed using a conduction isothermal calorimeter. The calorimeter is heated to test temperature (80° C. or 100° C.) with a heating rate of 2° C./min. Some typical thermogrammes obtained with retarder D are shown in FIG. 1. The time, at which the maximum of heat-flow peak is reached, is reported in Table 6.

TABLE 6

Effect of Different Retarders at 80° C. and 100° C. (Calorimetric Results)

| Retarder | | Temperature: 80° C. 4.44 L/tonne Silicate A | | Temperature: 100° C. 4.44 L/tonne Silicate A | |
|---|---|---|---|---|---|
| Label | Concentration | No | Yes | No | Yes |
| A | 0.06% BWOC | 18:54 | 14:54 | | |
| | 0.14% BWOC | | | 8:48 | 21:18 |
| D | 3.55 L/tonne | 22:18* | 14:12* | | |
| | 5.33 L/tonne | | | 6:24* | 19:48* |
| E | 3.55 L/tonne | 18:18 | 10:00 | | |
| | 5.33 L/tonne | | | 5:06 | 11:24 |
| F | 5.33 L/tonne | 26:36 | 20:48 | | |
| | 14.20 L/tonne | | | 8:18 | 9:54 |
| G | 6.21 L/tonne | 14:54 | 8:24 | | |
| | 12.43 L/tonne | | | 5:06 | 11:23 |
| H | 0.89 L/tonne | 12:36 | 4:30 | | |
| | 1.78 L/tonne | | | 9:12 | 8:00 |
| I | 8.88 L/tonne | 18:24 | 6:00 | | |
| | 15.98 L/tonne | | | 16:12 | 6:00 |
| J | 22.19 L/tonne | 16:24 | 8:54 | | |
| | 39.95 L/tonne | | | 7:54 | 5:24 |

*time to reach the maximum of the heat-flow peak on calorimetric curves (FIG. 1)

Whatever the retarder used, this time is reduced when adding 4.44 L/tonne of Silicate A to cement slurries tested at 80° C. In this case, the silicate behaves as an accelerator. At 100° C. the accelerating or retarding effect of Silicate A is dependent on the chemistry of retarder. A retarding effect is noted with retarders A, D, E, F and G, whereas an accelerating effect is observed with retarders H, I and J. These three retarders contain an organophosphonate. Silicate A acts as a retarder enhancer at 100° C. when it is used in combination with retarders covering a wide range of chemistries.

Sodium silicates with different $SiO_2$:$Na_2O$ ratios are tested at 100° C. in the presence of 0.14% BWOC of retarder A. A potassium silicate is also tested as well as a suspension of colloidal nanosilica. The concentration of these products was chosen to provide the equivalent of 0.18% BWOC of silica ($SiO_2$). Calorimetric results are given in Table 7.

These data confirm that sodium silicates with $SiO_2$:$Na_2O$ ratio of 1.63 and above act as effective retarder enhancers. The tested potassium silicate also provides a long thickening time. The suspension of nanosilica also gives retardation.

Figure 3:
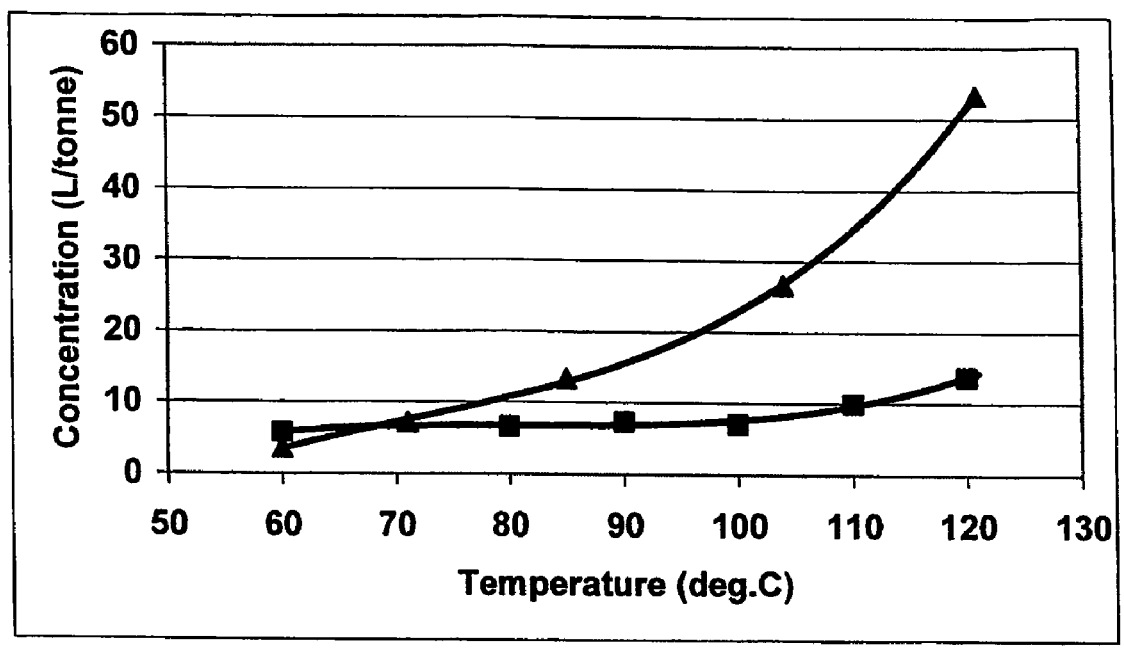
FIG. 3 shows a comparative plot of retarder sensitivity to temperature for a conventional retarder and a retarder according to one aspect of the invention.

One particularly preferred embodiment of the invention comprises an improved retarder comprising mixture of sodium gluconate and sodium silicate ($SiO_2$:$Na_2O$ weight ratio of 3.27). The high sensitivity to temperature of a conventional medium-temperature retarder (such as retarder I in Table 2 above) is plotted as ▲ in FIG. 3. It is noticed that the retarder concentration, required to provide a thickening time of 6 hours, increases exponentially with increasing temperature. These data can be compared with those obtained with the improved retarder of the invention plotted as ■ in FIG. 3 (hereinafter "retarder K") based on a mixture of sodium gluconate and sodium silicate ($SiO_2$:$Na_2O$ weight ratio of 3.27). The gluconate-to-silicate ratio is optimized to reduce the

TABLE 7

Influence of Different Silicates (or Nanosilica) at 100° C. (Calorimetric Results)

| | Reference | Silicate | | | | | | Nanosilica |
| --- | --- | --- | --- | --- | --- | --- | --- | --- |
| | | A | B | C | D | E | G | |
| Concentration (L/tonne) | — | 4.44 | 3.82 | 4.62 | 4.08 | 8.88 | 4.97 | 5.06  10.12 |
| Time* (hr:min) | 8:48* | 21:18 | 22:00 | 28:30 | 17:00 | 11:12 | 26:42 | 25:12*  35:50* |

Figure 2:
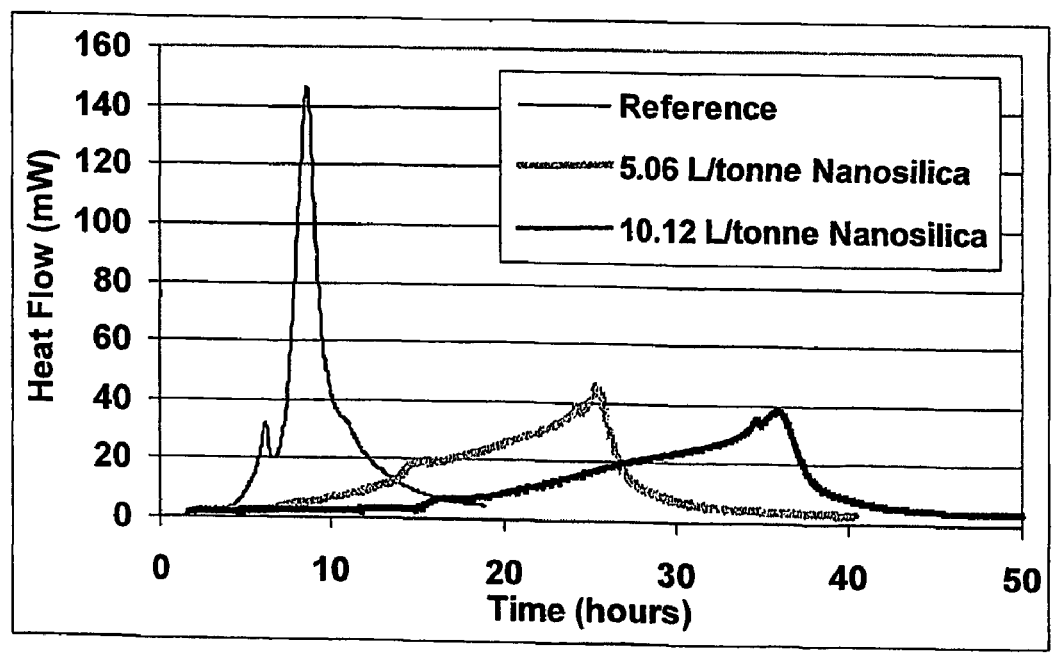
FIG. 2 shows calorimetric curves for slurries including retarder A and different quantities of nanosilica.

*time to reach the maximum of the heat-flow peak on calorimetric curves (FIG. 2)

The retarding effect of sodium silicates seems to depend on their $SiO_2$:$Na_2O$ weight ratio. The greatest effect is observed when the ratio is 1.99 and above. A significant retarding effect is still obtained with the silicate having a ratio of 1.63. The potassium silicate (weight ratio of 2.14 and molar ratio of 3.34) shows a strong retarding effect, comparable to that obtained with high ratio sodium silicates. The suspension of nanosilica (5.06 L/tonne provides 0.18% BWOC silica) retards the cement. FIG. 2 shows that the hydration profile of cement is altered in this case, with a slow increase in heat flow until reaching the maximum peak.

The products are also compared at 120° C. by measuring the thickening time of cement slurries retarded with 0.14% BWOC of retarder A. The concentration of silicates is chosen to provide the equivalent of 0.40% BWOC of silica. Results are gathered in Table 8.

sensitivity of retarder mixture to temperature. For this example, retarder K comprises 7.6 wt % sodium gluconate, 28.7 wt % sodium silicate and 63.7 wt % water. It can be seen that between 60° C. and 100° C. the concentration of retarder K has to be increased by only 21%, while it has to be increased by 570% for retarder I.

The performance of retarder K is compared to that of two conventional medium-temperature retarders (I and G of Table 2) when simulating a long cement column where the temperature at the top of cement is 40° C. below Bottom Hole Circulating Temperature (BHCT). Cement slurries were designed at BHCT of 80° C. and 100° C., targeting a thickening time of 5-7 hours. The setting time was determined at BHCT minus 40° C. using conduction calorimetry. The data gathered in Table 9 below:

TABLE 8

Influence of Silicate (or Nanosilica) on the Thickening Time at 120° C.
Pressure: 16,100 psi

| | Reference | Silicate | | | | | | Nanosilica |
| --- | --- | --- | --- | --- | --- | --- | --- | --- |
| | | A | B | C | D | F | G | |
| Concentration (L/tonne) | — | 9.94 | 8.52 | 10.21 | 9.14 | 14.91 | 11.18 | 11.19 |
| Thickening Time at 120° C. (hr:min) | 1:56 | 7:03 | 6:39 | 6:36 | 6:18 | 1:44 | 6:53 | 3:08 |

TABLE 9

Performance Comparison Between Improved Retarder K and Two Conventional Medium-Temperature Retarders I and G

| | | | | | | |
|---|---|---|---|---|---|---|
| Silica Flour (% BWOC) | — | 35 | — | 35 | — | 35 |
| Retarder K (L/tonne) | 6.48 | 6.84 | — | — | — | — |
| Retarder I (L/tonne) | — | — | 8.88 | 15.98 | — | — |
| Retarder G (L/tonne) | — | — | — | — | 6.21 | 19.53 |
| BHCT (° C.) | 80 | 100 | 80 | 100 | 80 | 100 |
| Thickening Time at BHCT (hr:min) | 5:53 | 5:32 | 7:10 | 5:30 | 5:36 | 5:22 |
| Temperature at top of cement column (° C.) | 40 | 60 | 40 | 60 | 40 | 60 |
| Setting time at top of cement column (hours) | 21 | 18 | 30 | 47 | 34 | not set after 144 hrs |

The following observations can be made:

Retarder K: the concentration has to be increased by only 6% when the BHCT increases from 80° C. to 100° C. The cement at the top of column begins to set within reasonable periods of time (less than a day).

Retarder I: the concentration has to be increased by 80% when the BHCT increases from 80° C. to 100° C. Compared to retarder K, the setting time is lengthened especially for the slurry designed at a BHCT of 100° C.

Retarder G: this retarder is by far the most sensitive to temperature since its concentration has to be increased by 215% when the BHCT increases from 80° C. to 100° C. As a consequence, the setting time at 60° C. is dramatically delayed when the slurry is designed for a BHCT of 100° C.

The shorter setting times of cement slurries retarded with retarder K can be attributed to:

At both 40° C. and 60° C. the presence of sodium silicate accelerates the hydration of cement, reducing its setting time.

Slurries containing the retarder I or G are over-retarded when tested at 60° C. owing to the high concentration of retarder required to provide adequate thickening time at 100° C.

The performance of retarder K is compared to that of a high-temperature retarder D. In this case cement slurries are designed for a BHCT of 120° C., and the setting time is determined at 40° C., 60° C. and 80° C. Results are shown in Table 10:

TABLE 10

Performance Comparison Between Improved Retarder K and a Conventional High-Temperature Retarder D

| | | |
|---|---|---|
| Retarder K (L/tonne) | 13.85 | — |
| Retarder D (L/tonne) | — | 7.99 |
| BHCT | 120° C. | 120° C. |
| Thickening Time at BHCT | 6 hr 44 min | 6 hr 13 min |
| Temperature at top of cement column | 80° C. | 80° C. |
| Setting time at top of cement column | 90 hours | not set after 204 hours |
| Temperature at top of cement column | 60° C. | 60° C. |
| Setting time at top of cement column | 55 hours | not set after 350 hours |
| Temperature at top of cement column | 40° C. | 40° C. |
| Setting time at top of cement column | 28 hours | not measured |

The thickening times are quite similar, allowing a fair comparison between the two retarders. The cement slurry with retarder D is not set after 204 hours and after 350 hours when cured at 80° C. and 60° C., respectively. This system is not tested at 40° C. because too long setting time is expected. The setting time of cement slurry retarded with retarder K is much shorter at 80° C. (90 hours) and is considerably shortened when decreasing temperature; 55 hours at 60° C., and only 28 hours at 40° C. These results clearly show that the accelerating effect of sodium silicate counteracts the retarding effect of sodium gluconate at low temperature.

Tables 11 and 12 below summarize the thickening time results (hrs:mins) obtained with batches of a construction cement (OPC ASTM Type II) using retarder K under different conditions. In each case the slurry tested is a 1870 kg/m³ density neat slurry.

TABLE 11

Thickening time results for OPC slurries with Retarder K at various concentrations for cement batches A, B and C and at 56° C. and 70° C.

| | Thickening Time Temperature ° C. | | | | | |
|---|---|---|---|---|---|---|
| | 56 | | | 70 | | |
| | Cement Batch | | | | | |
| Retarder K (l/tonne) | A | B | C | A | B | C |
| 5.3 | | | | | 2:40 | |
| 6.2 | 3:32 | 5:35 | 3:38 | | | |
| 7.1 | | | | | 3:30 | |
| 8.9 | 3:58 | | | 3:14 | 4:12 | 3:52 |
| 13.3 | 7:27 | | | 6:49 | 7:46 | 6:55 |

TABLE 12

Strength development for OPC slurries with retarder K at 6 l/tonne at 71° C. for cement batch A, 9 l/tonne at 71° C. for cement batch E, and 9 l/tonne at 93° C. for cement batch D.

| | | Strength Development Test Temperature, ° C. | | |
|---|---|---|---|---|
| | | 71 | | 93 |
| | | Cement Batch | | |
| | | A | E | D |
| Retarder K (l/tonne) | Strength | time | | |
| 6 | 50 psi | 4:16 | | |
| | 500 psi | 6:00 | | |
| | 2000 psi | 18:00 | | |
| 9 | 50 psi | | 5:56 | 9:28 |
| | 500 psi | | 7:56 | 12:04 |
| | 2194 psi | | | 15:00 |
| | 2500 psi | | 24:00 | |
| | 2944 psi | | | 19:00 |

Even these non-oilfield cements show adequate sensitivity to retarder concentration, consistent behaviour from batch to batch and fast strength development. The use of the new retarder allows the cement to be retarded sufficiently, and predictably, to allow use at typical bottom hole circulating temperatures encountered in well cementing without risking early set before the placement is complete, while still permitting adequate set at surface temperatures so as not to delay operations excessively.

The invention claimed is:

1. A retarder for use in well cementing slurries, comprising a mixture of a set retarder and one or more silicates or silica comprising an alkali metal silicate of the general formula $(SiO_2)x(M_2O)$ having a molar ratio falling in the range 1.68-3.37, wherein M is an alkali metal, the relative amounts of set retarder and silicates or silica are such that the retarding effect of the set retarder under downhole conditions is enhanced when compared to the retarding effect of the retarder alone, and the set of the cement at temperatures below 80° C. is accelerated when compared to the set of the cement containing the retarder wherein the amount of the silica or silicates allows the use of a lesser quantity of retarder than would be used alone for a given retarding effect at the bottom hole temperature above 90° C.

2. The retarder of claim 1, wherein the silica comprises colloidal silica having a particle size of less than 100 nanometers.

3. The retarder of claim 1, wherein the silicate comprises a sodium silicate with a $SiO_2$:$Na_2O$ weight ratio in the range 1.5-4 and a molar ratio 1.55-4.12, or a potassium silicate with a $SiO_2$:$K_2O$ weight ratio in the range 1-2.65 and a molar ratio 1.56-4.14.

4. The retarder of claim 1, where the retarder is selected from the list consisting of: sodium gluconate, calcium glucoheptonate, hydroxycarboxylic acids, mixtures of hydroxycarboxylic acids and lignosulphonates, mixtures of hydrocarboxylic acids and lignin amine derivatives, unrefined and refined lignosulphonates.

5. The retarder of claim 4, wherein the retarder comprises sodium gluconate and the silicate comprises sodium silicate with a $SiO_2$:$Na_2O$ weight ratio of about 3.27.

6. The retarder of claim 5, comprising 7.6 wt % sodium gluconate, 28.7 wt % sodium silicate and 63.7 wt % water.

* * * * *